May 15, 1934.  B. C. PLACE  1,958,678
ATTACHING FASTENERS TO PANELS AND THE LIKE
Filed April 3, 1931
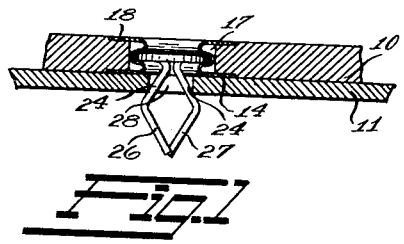
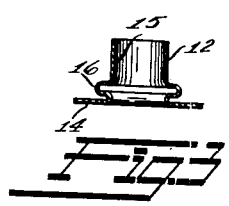
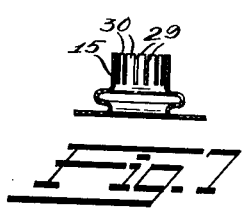
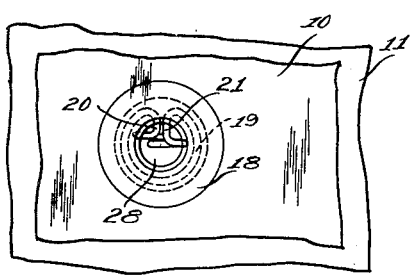
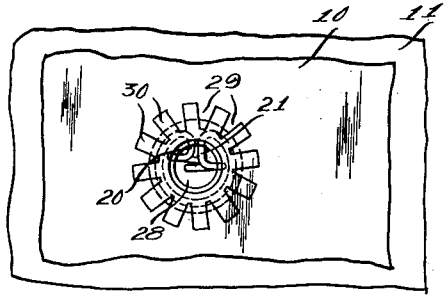
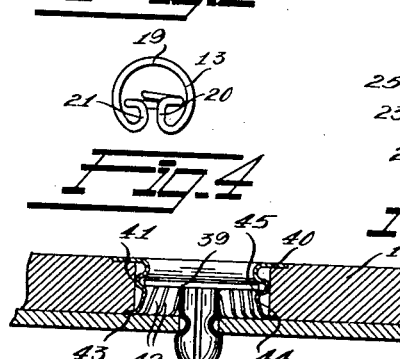
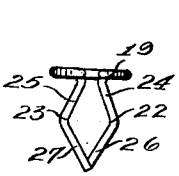
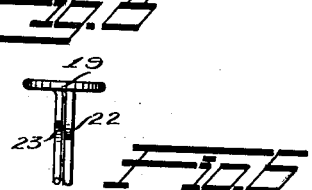
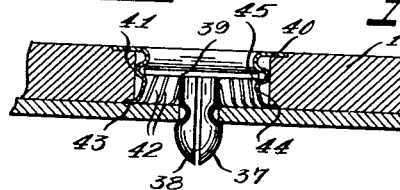
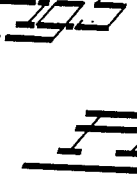
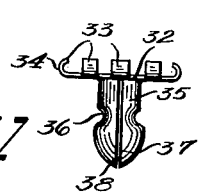
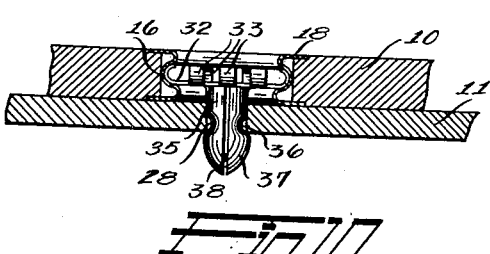
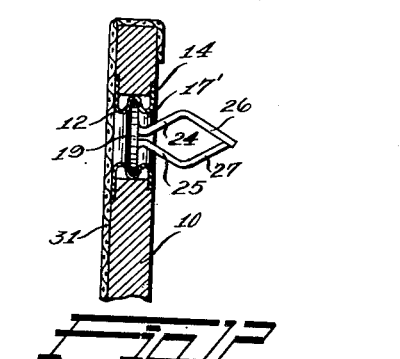
Inventor
Bion C. Place
By Strauch & Hoffman
Attorneys Patented May 15, 1934

1,958,678

UNITED STATES PATENT OFFICE 1,958,678

ATTACHING FASTENERS TO PANELS AND THE LIKE

Bion C. Place, Detroit, Mich., assignor of one-half to George E. Gagnier, Detroit, Mich.

Application April 3, 1931, Serial No. 527,551

5 Claims. (Cl. 45—138)

This invention relates to a method and arrangement for attaching stud fasteners of the snap type to panels, or the foundations of the panels, by bringing about an interlocking between the stud fastener and the panel either by snapping the fastener in a socket of the panel so that a portion thereof yields and then springs into interlocking relation to the panel, or so that a portion of the socket held by the panel yields sufficiently to bring about an interlocking by a snap action between the stud fastener and the panel.

Heretofore snap fasteners of the stud type have been assembled with respect to trim panels and the like in several ways. In one of these the fastener is passed through an opening in the panel from one side thereof until the head abuts against said side and until the shank of the fastener protrudes substantially beyond the other side of the panel. In securing panels, that are provided with an outer finish surface or covering which is not to be penetrated for the fastener, it is troublesome to use this arrangement because it necessitates the application of the cover or at least a portion thereof, after the fasteners have been passed through the foundation of the panel in the manner just stated. To obviate this difficulty it has been heretofore proposed to form the openings in the foundation or body of the panel in such a way that the head of the fastener may be passed through the foundation or body, from the rear face thereof, after the covering has been applied to the front face. This arrangement however requires the formation of relatively large and specially formed openings, which if made close to the margins of the foundations of the panel have a tendency to weaken it. At the same time the head of the stud fastener is in both instances disposed between the outside of the foundation or body and the covering material, when such is used, providing a slight projection or protuberance that may under certain circumstances be visible through the covering material.

The other arrangement heretofore generally used for anchoring snap stud fasteners with respect to the foundation or body of a panel have included various sheet metal socket members to receive the head of the fastener. The sheet metal socekt members were generally permanently assembled with respect to the fastener by the manufacturer, so that the assembly of the socket members and snap fastener proper could be supplied as a unit to the user of the assembly. In this arrangement the socket members were attached to the panels by various ways and methods, necessitating the use of machinery to bring about the attachment between the socket members and the panel. Furthermore, in the latter arrangement the fasteners considered as a whole were of relatively complex constructions.

Such fasteners also necessitate the application of the socket member, and the snap fastener carried thereby, in relation to the trim panel prior to the application of the covering material, this procedure, making it difficult to apply the covering material, because of the protruding fasteners that project from the foundation or body of the panel during the covering. Furthermore, in the arrangements of the kind generally heretofore used, not infrequently the socket member for the fastener also projected substantially beyond one or both faces of the body or panel causing projections or protrusions from the faces of said body that may become visible through covering material, or that may serve to space the body of the panel from the supporting structure so that said body does not lie snugly against said supporting structure.

This invention aims to provide a method and assembly of stud fastener and panel, that avoids the disadvantages in the method and assemblies heretofore proposed, by eliminating the projection of the socket, provided to receive the fastener, substantially beyond both faces of the body of the trim panel, by eliminating projection of the head of the stud beyond either surface of the body, and by providing a socket member and stud fastener of such construction that the assembly of the socket member and the stud may be effected after the covering material has been applied to the panel, when the arrangement is utilized in the attaching of covered panels in position, as in the construction of an automobile or similar bodies.

An important object of the invention accordingly is to provide a socket for the reception of a stud fastener of the snap type, so arranged that neither the socket nor the head of the fastener will project beyond either face of the body of the panel to which it is applied.

Another important object of the invention is to provide an arrangement of socket member and stud fastener in which the socket member and said fastener are designed so that they may be brought into assembled relation by a snap action from either face of the foundation or body of the panel, after the socket member, designed to receive the said fastener, has been separately applied to said body.

A further object of the invention is to provide a method of assembling stud fasteners and socket members to trim panels, and the like, by first applying the socket member to such panel and subsequently interlocking the said fastener to said socket.

Still further objects of the invention will appear as a description thereof proceeds with reference to the accompanying drawing, in which Figure 1 is a fragmental transverse sectional view through a portion of a trim panel and a supporting structure showing a preferred form of stud fastener and socket for securing the panel to said structure.

Figure 2 is a plan view of the arrangement illustrated in Figure 1.

Figure 3 is a sectional view of a socket member consisting of a grooved grommet in the form that it assumes prior to the application thereof through the opening in the body or foundation of the trim panel of Figure 1.

Figures 4, 5 and 6 are respectively, a top view and two side elevational views of a preferred form of stud fastener utilized to secure the panel in position.

Figure 7 is a sectional view of a modified form of grommet that may be used in place of that illustrated in Figure 3.

Figure 8 is a view similar to Figure 2 showing the grommet of Figure 7 in assembled relation with respect to the foundation or body of a trim panel.

Figure 9 is a fragmentary sectional view showing another type of said fastener and another arrangement of grommet permitting the fastener to be assembled in respect to the foundation of the body by means of a snap action.

Figure 10 is a sectional view showing a further modification.

Figure 11 is a side elevational view of the fastener included in Figure 10.

Figure 12 is a fragmentary sectional view showing how the invention as shown in Figure 3 is used in connection with the covered panel.

Like reference characters indicate like parts throughout the several figures.

Referring first to the form of the invention shown in Figures 1, 2 and 3, the member 10 designates the body or foundation of the cover material, such as the body or foundation of the trim panel of an automobile body for example. The invention aims to secure such a body to a supporting structure 11, for example, by means of snap fasteners that will serve to firmly attach the body snugly against said supporting structure, and without causing any part of the fastener to project beyond the inner or outer surfaces of said body. The body 10 may be constructed of any suitable material. When the finishing of the automobile bodies is involved, for which this invention is particularly designed, the body can consist of a piece of card-board of relatively stiff character and of substantial thickness. The body is provided with fastener receiving openings preferably arranged at equally spaced intervals along the margins of the body whatever its form.

As illustrated, each fastening unit comprises a grommet 12, which is especially formed so as to provide a socket for the reception of a stud 13, which stud is provided with an expansible and contractible head enabling it to be contracted in entering the opening smaller than the overall width of the head and to subsequently expand in the opening or socket of the supporting structure to prevent the withdrawal of the fastener.

The grommet 12 forming one part of each fastener unit, consists of an outwardly projecting annular flange 14, a sleeve-like portion 15 provided with an annular groove 16, preferably, formed by corrugating the sheet metal of which the grommet is formed. The grommet is applied to an opening 17 in the body 10 by inserting the sleeve-like portion 15 thru said opening until the flange 14 contacts with one side of the body adjacent said opening. The grommet is then interlocked with respect to the panel by spinning or bending the upper portion of the sleeve-like portion 15 outwardly to form an annular flange 18 bearing on the body 10 on the side thereof opposite the side against which the flange 14 bears. Preferably the flanges 14 and 18 are pressed into the fibrous material of which the body may be formed so that a flush joint is provided between the flanges 14 and 18 and the adjacent portions of the body, so that the socket member or grommet 12 does not, when it is in assembled relation, protrude beyond either surface of the body 10. Since groove 16, as illustrated in Figure 1, is, when the grommet is assembled, disposed approximately midway between the outer and inner surfaces of the body 10, the head of the stud fastener is disposed wholly between said surfaces, that is, it does not project beyond either surface.

The grommet or socket member may be assembled with respect to the panels prior to the assembly of the stud fastener with respect thereto, in view of the fact that no part of the grommet or socket member protrudes beyond the outer or inner surfaces of the body, the panels may be readily packed and shipped with the grommets applied in position, it being preferred to assemble the stud fastener, with respect to the panel, just prior to the application of the body to the supporting structure, so that it will be unnecessary to handle or ship any covering material having protruding fasteners, prior to the time that said covering material or panel is to be applied to the supporting structure.

The stud fastener designed to cooperate with the socket member or grommet just described may assume various forms. The essential characteristics of said fastener, however, when the grommet or socket member of the form shown in Figs. 1 and 2 is used, is that the head of the stud be capable of resilient expansion and contraction so that the assembly of the stud with respect to the socket member or grommet may be conveniently brought about by a snap action, when it is desired to apply said fasteners to the covering material. Preferably a stud fastener such as shown in Figs. 4, 5 and 6 is used, this fastener possessing a head that has the necessary inherent characteristics to bring about convenient assembly of the grommet or socket member and the head of the stud fastener. The stud fastener presently to be described is covered by my Patent Number 1,679,266 granted July 31st, 1928, and reference may be had to said patent for a more complete description of the fastener. Briefly the fastener is constructed of a single piece of spring wire, the midportion of which is bent into the form of a loop 19 constituting the head of the fastener. The portions of the wire adjacent the part from which loop 19 is formed are turned inwardly in the plane of the loops as indicated in 20 and 21, providing arms that carry the ends of the wire constituting the shank thereof. Said ends are turned approximately into planes at right angles to the loop 19 and are bowed outwardly between the head or loop 19 and the tips of said ends of the wire from which the stud fastener is formed, as shown at 22 and 23, thus providing divergently disposed holding portions 24 and 25 and convergently disposed guiding portions 26 and 27. It will be observed from Figure 4 that the arms 20 and 21 are disposed in spaced relation, so that the loop 19 may be contracted in diameter for the purpose presently to be referred to. The stud fastener is preferably bent into the form just described prior to the tempering of the wire. After it is bent into said form the wire is tempered, providing a spring stud fastener having a high degree of stiffness, as well as sufficient resilience so that the fastener may be contracted and expanded in use.

The one-piece wire stud fastener is assembled with respect to the body 10 by contracting the loop 19 so that said loop may pass into the grommet 12, which is formed smaller than the head in normal form after which said head is permitted to expand into the groove formed by the corrugation therein. The stud of the fastener may accordingly be assembled with respect to the panel by a snap action, use being made of the characteristic of the head of the fastener that it is expansible and contractible. As illustrated in Figure 1, when the loop 19 is sprung into the groove 16 in the grommet, the head of the fastener is disposed between the inner and outer surfaces of the foundation of body 10 with the shank of the fastener projecting a substantial distance beyond the inner face of said body.

In use, the foundation or body is provided with a multiplicity of stud fasteners interlocked with the grommet in the manner just stated, after which the panel may be applied to the supporting structure 11 by applying pressure in a direction parallel to the length of the shank of the fastener after entering said shank in the perforations 28 in said supporting structure. When the stud fasteners are entered in said perforations the guiding portions 26 and 27 engage the corners of said perforations and as pressure is applied to the fastener the divergently disposed portions 24 and 25 are brought close enough together to permit the shank of the fastener to be passed through the openings 28. As the movement of the fastener is continued through said opening the divergently disposed holding portions 24 and 25 spring apart and engage the inner corners of the opening of the supporting structure serving to firmly and resiliently draw the covering material into contact with the supporting structure in the manner fully described in my patent above referred to.

If desired the grommet may be made in the form shown in Figure 7, in which the skirt 15 thereof is slotted at a multiplicity of places as indicated at 29, providing a multiplicity of tongues 30, which in operative position are bent over upon the surface of the covering material, and are preferably pressed into said material as indicated in Figure 8 to provide flush joints. This arrangement permits the ready assembly of the grommet with respect to the body since the tongues 30 may more readily be brought into contact with the body 10, than the flange 18 of the form shown in Figure 1. Moreover, this construction can be adapted to openings of varying sizes in the panel constituting the covering material by bending the tongues 30 to a greater or less degree, so that the material is firmly gripped between said tongues and the flange 14 abutting against the opposite side of the covering material.

The arrangements so far described may be conveniently used to secure covered panels to automobile or similar bodies, in view of the fact that the stud may be assembled with respect to the panel after the covering material is applied thereto as above pointed out.

Referring to Figure 12, a covered panel consisting of the foundation or body 10' of a trim panel is illustrated. Said foundation or body 10' is provided with an opening 17' therein. The grommet 12 is applied to said foundation in the manner above described in any suitable manner. In this condition the foundations may be readily transported and handled because there are no substantial projections from either face thereof. Such foundations may then be covered with a suitable fibrous finishing material 31 that is wrapped around the edges in well known manner, the fabric lapping said edges terminating short of the openings in the grommets. The stud fasteners may be assembled with respect to said foundations just prior to the application of the foundation to the supporting structure.

If desired, sheet metal stud fasteners such as shown in Figure 11 may be used instead of the preferred one-piece wire stud fasteners above described. Such a fastener may include a head in the form of a sheet metallic disk 32, having a multiplicity of tongues 33 radiating outwardly therefrom. Said tongues may be curved upwardly as shown at 34 providing spring fingers that are inwardly curved at their tips to provide guiding surfaces that will serve to swing the tongues inwardly when the head of the fastener is entered into a grommet in the manner presently to be described. The head 32 is provided with a sheet metal contractible and expansible shank similar to the above fastener, said shank comprising a neck portion 35 and a reduced portion 36 and a globular or spherical portion 37. The shank of the fastener is split as shown at 38 to divide it into segments which permit the shank of the fastener to be contracted, as it enters the perforation or socket designed to receive it, and to subsequently expand in said socket or perforation.

The fastener just described may be assembled with respect to a grommet 12, provided with a groove 16, that is secured to the body of covering material 10 as shown in Figure 10 in the manner above described. By entering the head 32 of the fastener into said grommet the curved annular surfaces of the grommet engaging the curved surfaces of the tips of the tongues 33, cause an inward bending of said tongues enabling the head of the fastener to be pressed inwardly so that the said tongues may be disposed opposite the groove 16. When in this position, the tongues spring into the said groove firmly holding the fastener in interlocked relation to the grommet or equivalent socket member.

After the stud fastener just described has been assembled with respect to the panel or body 10, in the manner just stated, the panel may be attached to the supporting structure 11, by entering the shank of the sheet metallic fastener into the opening 28 provided therein to receive it in a manner now well known in the art.

If desired a stud fastener may be used including a head that is not contractible and expansible, in which event a grommet would be used in which a part thereof is contractible and expansible so as to permit the assembly of the fastener with respect to the grommet by a snap action. An arrangement of this character is illustrated in Figure 9 of the drawings in which a fastener of the type shown in Figure 11 is provided with a disc-like head 39 of usual character in which form it can not readily be contracted. Grommet 40 may be used to hold said fastener in respect to the body 10 of the covering material. Such grommet may be provided with an annular groove 41 for the reception of the head 39 of the fastener. In order that said head may be inserted in said groove by a snap action, the grommet is provided with a multiplicity of flexible tongues 42 that lap the inner surface of the body 10 as shown at 43, and are each shaped to provide an inclined guiding surface 44 to a relatively sharp shoulder 45, forming one side of the groove 41 in the grommet 40. The fastener is assembled with respect to the construction just described by forcing the head 39 into the grommet, the tongues 44 yielding sufficiently to permit the entry of said head in the groove 41. When the head reaches this position the tongues spring outwardly presenting shoulders 45 that serve to hold the fastener in interlocked relation with respect to the body or covering material. In this form of the invention, as well as in the other forms sufficient play may be maintained between the bottom of the grooves in the grommets and the edges of the head of the stud fastener so that slight lateral shifting of the stud fastener with respect to the socket may be provided. Such play will enable the shank of the fastener to be brought into registry with any opening or socket in the supporting structure that does not accurately align with said shank. In actual practice it is difficult to secure exact alinement between the fastener and the openings in the supporting structure.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by U. S. Letters Patent is:—

1. Upholstery or covering material ready for attachment to a supporting structure, comprising, covering material provided with a perforation, a grommet lining said perforation and provided with a groove, a snap fastener having a contractible and expansible head snapped into the groove in said grommet.

2. Upholstery or covering material ready for attachment to a supporting structure, comprising, covering material provided with a perforation, a metallic element lining said perforation, a fastener having a relatively wide and thin head and a shank projecting away from said head, said fastener being held in interlocked engagement with said material by means of resilient members forming a part of said element and engaging said head within said perforation.

3. The combination defined in claim 2 in which said element is a grommet and said members are separated tongues forming inclined surfaces to guide the head of the fastener into operative position, each tongue having a shoulder to engage a part of said head to prevent withdrawal of said fastener.

4. In combination, a supporting structure having an opening, covering material lapping said supporting structure and provided with a perforation disposed opposite said opening, a grommet lining said aperture, and provided with a circumferential groove, and a snap fastener having a head and a shank securing said material to said structure, said head being sprung into the groove in said grommet and said shank being sprung in said opening.

5. Upholstery material ready for attachment to a supporting structure comprising covering material, an annular sheet metallic element secured to said material, said annular element being provided with means to interlock a fastener inserted therein into position, and a fastener having a relatively wide and thin head and an elongated shank extending away from said head interlocked with said element by snapping said head in said element, said head being constructed of spring wire bent into the form of a loop with separated ends.

BION C. PLACE.